(12) United States Patent
Tewari

(10) Patent No.: US 6,495,793 B2
(45) Date of Patent: Dec. 17, 2002

(54) LASER REPAIR METHOD FOR NICKEL BASE SUPERALLOYS WITH HIGH GAMMA PRIME CONTENT

(75) Inventor: Sudhir Kumar Tewari, West Chester, OH (US)

(73) Assignee: General Electric Company, Schenectady, NY (US)

( * ) Notice: Subject to any disclaimer, the term of this patent is extended or adjusted under 35 U.S.C. 154(b) by 20 days.

(21) Appl. No.: 09/833,487

(22) Filed: Apr. 12, 2001

(65) Prior Publication Data

US 2002/0148817 A1 Oct. 17, 2002

(51) Int. Cl.[7] .............................................. B23K 26/34
(52) U.S. Cl. .................. 219/121.64; 148/525; 148/565; 219/121.66; 427/596
(58) Field of Search ....................... 219/121.63, 121.64, 219/121.65, 121.66, 121.85; 427/596; 148/525, 565, 512

(56) References Cited

U.S. PATENT DOCUMENTS

| | | | |
|---|---|---|---|
| 4,730,093 A | | 3/1988 | Mehta et al. .......... 219/121.63 |
| 4,804,815 A | | 2/1989 | Everett ................... 219/121.6 |
| 4,958,058 A | | 9/1990 | Scheidt et al. ......... 219/121.63 |
| 5,395,584 A | * | 3/1995 | Berger et al. |
| 5,900,170 A | | 5/1999 | Marcin, Jr. et al. ..... 219/121.66 |
| 5,914,059 A | | 6/1999 | Marcin, Jr. et al. ...... 219/121.6 |
| 6,054,672 A | * | 4/2000 | Foster et al. ........... 219/121.66 |
| 6,269,540 B1 | * | 8/2001 | Islam et al. |
| 6,364,971 B1 | * | 4/2002 | Peterson et al. ....... 219/121.64 |

* cited by examiner

Primary Examiner—Geoffrey S. Evans
(74) Attorney, Agent, or Firm—David L. Narciso; Lee H. Sachs

(57) ABSTRACT

A laser repair method for a high gamma prime content Ni base superalloy substrate surface, with gamma prime content in the range of at least about 30 volume %, conducts the repair at ambient temperature without preheating the substrate surface and by controlling processing parameters to avoid cracking of the resulting weld bead during and after welding. The laser beam, operating in a power range of about 50–10000 watts per centimeter, is focused away from the substrate surface to provide a laser spot in the size range of about 0.03–0.2". A relative movement between the substrate surface and the laser beam, for example at a rate in the range of about 1–100 inches per minute, provides an interaction time of no greater than about 10 seconds between the laser beam and the substrate surface. Concurrently, a repair alloy powder is deposited in the laser beam to melt and fuse the repair alloy powder into a molten repair alloy deposited on the substrate surface.

6 Claims, 1 Drawing Sheet

LASER REPAIR METHOD FOR NICKEL BASE SUPERALLOYS WITH HIGH GAMMA PRIME CONTENT

BACKGROUND OF THE INVENTION

This invention relates to the repair of a nickel base superalloy with a gamma prime content in an amount sufficient to result in cracking during fusion type repair. More particularly, it relates to a method for avoiding cracking during repair of an article made of such an alloy using laser fusion or welding.

Operation of modern gas turbine engines, particularly for use in aircraft, includes exposure to very high temperatures under strenuous conditions of environment and mechanical forces. To enable such operation, high temperature nickel base superalloys have been developed with high gamma prime content, for example to provide one or more of improved properties such as mechanical, castability, resistance to the strenuous operating environment, etc. To assist in providing such properties, currently used forms of such alloys are made with relatively large amounts of strengthening elements, for example including at least one of Al, Ti, V, Ta, etc. Inclusion of such amounts of strengthening elements results in the formation of relatively large amounts of the well known and widely described gamma prime phase, for example in amounts of at approximately 30 volume percent or higher. There are many commercially known and used examples of such high gamma prime content alloys. These alloys include Rene' 80 Ni base alloy with a gamma prime content in the range of about 30–50 vol. %, forms of which are more fully described in U.S. Pat. No. 3,615,376—Ross et al. (patented Oct. 26, 1971); Rene' 142 Ni base alloy with a gamma prime content in the range of about 60–70 vol. %, forms of which are more fully described in U.S. Pat. No. 4,169,742—Wukusik et al. (patented Oct. 2, 1979); and Rene' N5 Ni base alloy with a gamma prime content in the range of about 60–75 vol. %, forms of which are more fully described in U.S. Pat. No. 5,173,255—Ross et al. (Patented Dec. 22, 1992).

Certain current fusion type repair, such as welding, of defects in turbine engine articles made from a high gamma prime content Ni base superalloy, either resulting from manufacture or from exposure to operating conditions, can result in cracking of the article. High gamma prime containing Ni base superalloys are well known to be prone to micro and/or macro cracking during welding or during post weld heat treatment (PWHT). Strain age cracking is widely believed to be the main cause of such cracking. As a result, current welding methods to repair an article, for example a worn or damaged tip of a gas turbine engine turbine blade airfoil made of a high gamma prime content Ni base alloy, requires preheating of the article to a relatively high temperature, typically above about 1400° F., and holding at such temperature during welding, to avoid cracking. Preheating methods prior to fusion repair, such as using a laser, have been described in such U.S. Patents as U.S. Pat. No. 4,804,815—Everett; and U.S. Pat. Nos. 5,900,170 and 5,914,059—Marcin, Jr. et al.

A manual or semiautomatic Tungsten Inert Gas (TIG) or automated laser welding method generally has been used for repair build-up on such a preheated substrate. However, known methods involving preheating prior to welding, with the temperature maintained during welding, suffer from the deficiency that precise temperature control of a relatively narrow substrate such as an airfoil tip must be maintained in order to achieve good results or yield. In addition, such a repair method is relatively slow, as well as costly, because it requires equipment and time for heating to and holding during welding at the required preheating temperature. Also, such method requires that the article surface being repaired be constantly shielded from the oxidizing environment during preheating, weld repair at the preheating temperature, and cooling from the preheating temperature after welding.

BRIEF SUMMARY OF THE INVENTION

The present invention, in one form, provides a laser repair method for repairing a Ni base superalloy substrate, having a gamma prime content of at least about 30 vol. %, conducted at ambient or room temperature, without the use of or need for preheating by reducing the interaction time between the substrate and a molten repair alloy to avoid cracking of the substrate during weld repair. The method comprises providing and maintaining a substrate surface at ambient temperature in juxtaposition with a laser that operates in the power range of about 50–10000 watts per square centimeter. The beam of the laser is focused at a point away from the substrate surface, sometimes referred to as defocused, to provide at the substrate surface a laser spot in the size range of about 0.03–0.2" diameter, or its equivalent. The method includes, in such combination, relative movement between the substrate surface and the laser to provide an interaction time of no greater than about 10 seconds between the laser beam and the substrate surface. In one form, the rate in the range of about 1–100 inches per minute. Concurrently rather than subsequently, a powdered repair material is deposited into the laser beam, in one form at a feed rate in the range of about 0.4–15 grams per minute, into the laser spot on the substrate surface. At this combination of laser density, relative movement rate and concurrent repair powder delivery, the laser beam melts and fuses the powder into a molten repair material at a relatively low interaction time, one form of which is in the range of about 0.01–10 seconds between the laser beam and the substrate. This combination avoids cracking of a substrate highly susceptible to cracking when repairing at ambient temperature. The need for preheating the substrate before and during welding thereby is eliminated.

DETAILED DESCRIPTION OF THE INVENTION

Figure 1:
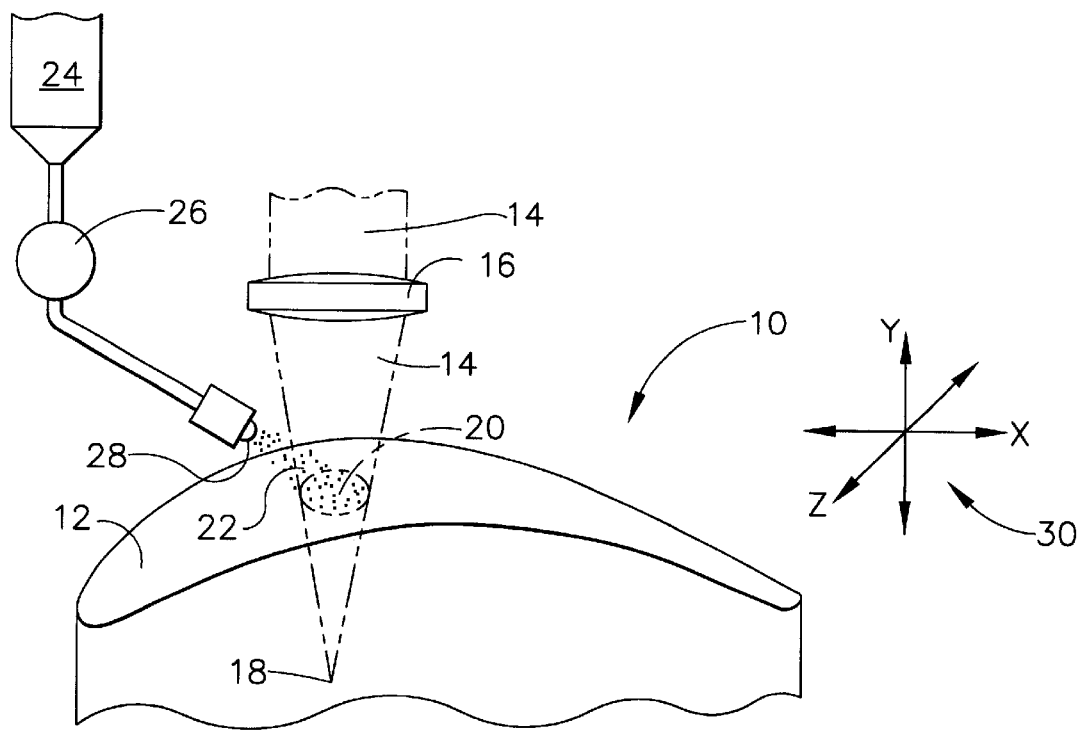
FIG. 1 is a diagrammatic, fragmentary view of one form of apparatus practicing an embodiment of the present invention.

The present invention, in one embodiment, provides a method for weld repairing, without preheating, a gas turbine engine blade airfoil made of a Ni base superalloy having a gamma prime content of at least about 30 vol. %, and generally in the range of about 40–75 vol. %. At such a gamma prime amount, the superalloy substrate is prone to cracking if repaired at an ambient temperature. Therefore, certain prior methods have used preheating and heating during repair welding to avoid such cracking. The method of the present invention is particularly useful for repairing an airfoil radially outer tip, known to be more subject to cracking during fusion type repair.

One example of a known repair method is described in the above identified Marcin, Jr et al patent. In that method, although the power density is relatively low, the interaction time range is high and the powder is added to a melt pool already generated on the substrate surface by the laser beam. Cracking is alleged to be eliminated due to high interaction time of the laser with the substrate during initial deposition or during remelting of the initial deposit. Such higher interaction time is provide to allow the substrate to achieve higher temperature which is alleged to lead to lower solidification stresses and reduction in cracking.

The present invention eliminates cracking through the combination of lower power density and lower traverse speeds while maintaining relatively low interaction time in the range of about 0.01–10 seconds. Through this combination, a reduced heating of the substrate is achieved during repair processing, eliminating the generation of thermal stresses during and after solidification, thereby reducing the propensity for cracking. By maintaining lower temperature of the substrate, additional gamma prime precipitation is avoided near the fusion zone in the substrate, ductility of the substrate is maintained, and volumetric and thermal expansion in the substrate is minimized. Stresses associated with shrinkage of the solidifying molten material and expanding substrate material therefore are reduced, reducing cracking. No remelting of the deposited repair alloy is necessary.

Another example of a known repair method is described in the above identified Everett patent. That method proposes reduction in strain age cracking by rapidly solidifying the deposit in order to reduce precipitation of gamma prime in deposits of superalloys including high gamma prime. The present invention reduces cracking with a lower rather than higher cooling rate in combination with a lower rise in substrate temperature as a result of selection of lower traverse speeds and lower power density for a selected powder feed rate.

Through a combination of controlled laser density and relative movement between the laser and the substrate surface being repaired, the present invention provides a low interaction time between the laser and the substrate to avoid cracking of the substrate during welding at ambient temperature. The method of the present invention enables laser repair welding of a superalloy including high gamma prime without inducing cracks during weld repair. The weld repair material can be selected from a variety of alloys substantially the same as or different from the substrate alloy, and need not be a high gamma prime alloy. However, in one example, the repair alloy powder was a high gamma prime Ni base repair alloy, matched with the substrate alloy in that it was substantially the same as or compatible with the high gamma prime Ni base superalloy of the substrate.

The repair powder, for example in the size range of about −80 to +325 mesh size, is delivered at a rate preferably in the range of about 0.4–15 g/min. into the laser beam toward the airfoil tip. This has been accomplished, in one embodiment, using a commercially available powder feeder, through a commercially available nozzle, typically with the help of an assisting noble or non-oxidizing gas. The powder delivered at such a rate then is melted, fused, and deposited as a molten repair material on the airfoil tip substrate surface using a $CO_2$ laser beam that also is delivered to such surface typically generally about the powder stream. The repair powder can be delivered co-axially with the laser beam as well as off-axis from the laser beam.

No other heating of the substrate is used in the present method before or during repair. Therefore, due to reduced laser power density heating of the substrate is reduced below an amount that can develop detrimental strain in the repair material after cooling, thus to avoid subsequent cracking at the area of repair. A main factor responsible for cracking in high gamma prime Ni base superalloys has been established in the art to be strain age cracking. Excessive heat input during a welding repair operation in combination with geometric constraints on a relatively narrow substrate, such as an airfoil tip, has caused the tip weld to crack during or after welding. As a result of practice of the present invention, multiple layers of a desired thickness and width have been deposited successfully on the substrate, without cracking. For example, commercial computer controlled equipment has been used to control processing parameters and substrate positioning, to achieve a desired weld build up on the substrate surface. According to the present invention, the micro and macro cracking problems experienced during and/or after repair welding using known processes is avoided by control of heat input at the surface of weld repair. Such control is provided through selection of a combination of laser power, laser beam focus away from the substrate surface to provide a selected spot size range, powder feed rate and relative movement between the substrate surface and the laser spot. The rise in the temperature of the substrate during welding deposition also is controlled by proper selection of these parameters.

The present invention will be more fully understood by reference to the figures of the drawing as two diagrammatic fragmentary views of commercially used apparatus practicing forms of the present invention. In the FIGS. 1 and 2 of the drawing, a metal article is shown fragmentarily generally at 10, in the form of an airfoil, for example an airfoil of a gas turbine engine turbine blade, one embodiment of which is described in U.S. Pat. No. 5,458,461—Lee et al. (patented Oct. 17, 1995). Airfoil 10 includes an airfoil tip surface 12 as a substrate surface at which weld repair is being conducted. A commercial laser (not shown) is disposed in juxtaposition with surface 12 and operated in the power range of about 50–10000 watts per square centimeter. With airfoil 10 and tip surface 12 maintained at ambient temperature, laser beam 14 from the laser is focused by a lens 16 at a focal point 18 away from surface 12. This defocused beam, provides on surface 12 a laser spot 20 in the size range of about 0.03–0.2" in diameter.

Figure 2:
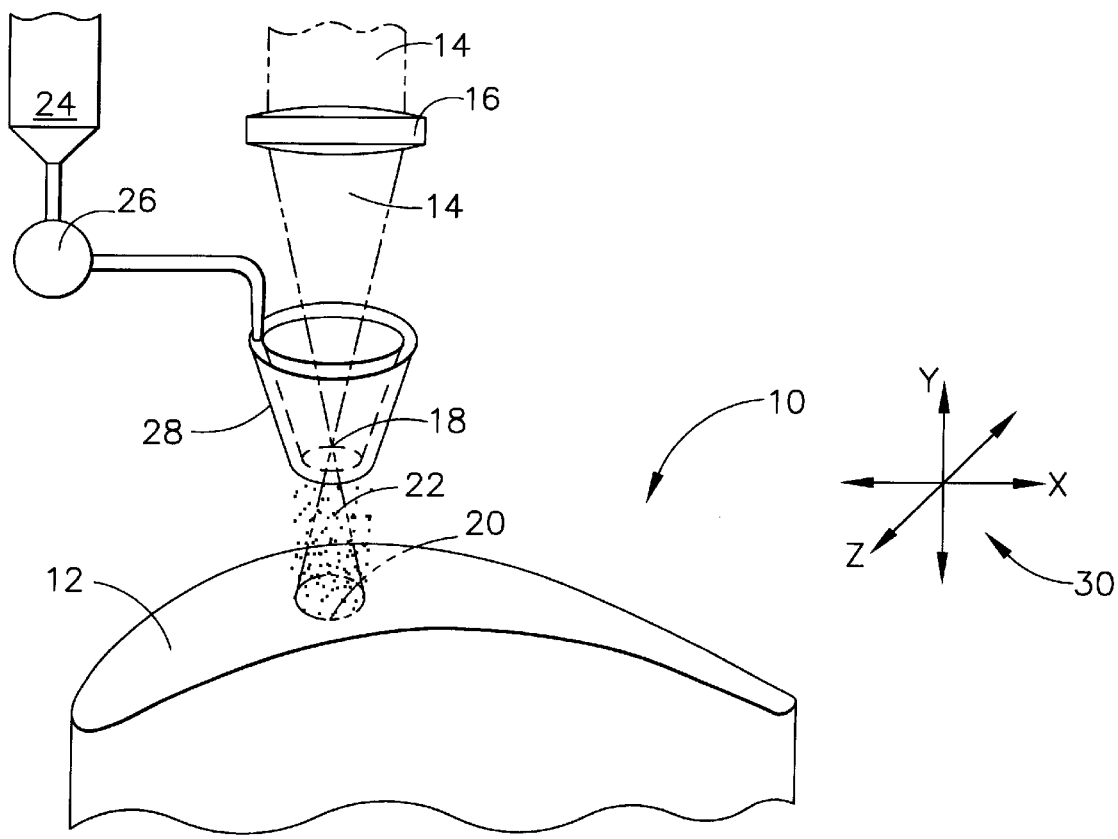
FIG. 2 is a diagrammatic, fragmentary view of another form of apparatus practicing an embodiment of the present invention.

In FIG. 1, laser beam 14 is focused at a focal point 18 below surface 12 to provide laser spot 20 on substrate surface 12. In FIG. 2, laser beam 14 is focused at a focal point 18 above surface 12 to provide laser spot 20 on substrate 12. In both figures, a repair alloy powder 22 is delivered simultaneously with the beam, off-axis in FIG. 1 and co-axially in FIG. 2.

Repair alloy powder 22 is deposited in laser beam 14 over laser spot 20 at a powder feed rate in the range of about 0.4–15 g/min. Powder 22 is provided from a powder source 24 by commercial powder feeder 26 and a pressurized noble gas (such as Argon) through powder nozzle 28 into laser beam 14 over laser spot 20. Powder 22 is melted and fused by laser beam 14 and deposited as a molten repair material at surface 12 in laser spot 20. Relative movement between laser beam 14 and surface 12 is provided and controlled in the embodiment of the drawing by commercial numerical controlled apparatus, diagrammatically represented generally at 30, associated with and carrying article 10.

In one specific evaluation of the present invention, a damaged radially outer tip surface portion of a gas turbine engine high pressure turbine blade airfoil made of the above identified Rene' 142 Ni base superalloy having a gamma prime content in the range of about 60–70 vol. %, was repaired according to a form of the present invention. The repair powder used in this example was a Rene' 142 alloy powder in the size range of about −80−+325 mesh. The airfoil tip, ground to a selected dimension to remove damaged material, was cleaned and then was repair welded using a combination of process parameters controlled to reduce heat input to the tip portion.

The airfoil tip was carried by apparatus controlled with a commercial numerical controlled program for relative movement, in the range of about 1–25 inches per minute, in juxtaposition with a commercial Rofin Sinar $CO_2$ laser operated in the power range of about 50–1500 watts. The laser beam from the laser was focus away from the surface portion to provide on the radially outer surface a laser spot in the range of about 0.03–0.20 inches in diameter to reduce the overall power density (power per unit area). During such relative movement under these conditions, the repair powder was deposited substantially concentrically in the laser beam above the laser spot by a commercial Metco 6MP Dual Powder Feed System and a GE Funac 15MA controller. The feed rate of the repair powder was in the range of about 0.4–15 g/min. assisted and covered by a shielding gas of Argon flowing at the rate of about 30–100 cubic feet per minute. This combination, selected according to a form of the present invention, carefully controlled the heat input to the surface portion being repaired, reducing stresses in the substrate and avoiding cracks in the weld without the requirement of other or additional heating of the substrate before or during welding. A series of 3–6 welds were superimposed to provide the desired weld build up. After welding, the welds were heat treated, final machined to design dimensions, blended to the airfoil shape, cleaned, etched and inspected by fluorescent penetrant inspection and x-ray for the presence of cracks. None of the blade airfoil tip welds showed any crack indications.

The relative traverse speed between the laser beam and the surface being repaired is maintained relatively low so as to avoid rapid cooling rates during solidification of the repair material. Prior methods in which relatively higher traverse speeds have been used result in higher cooling rates that generate excessive stresses during or after welding. The presence of such excessive stresses has resulted in weld cracking not only during welding but also during post weld heat treatment operations. One principal advantage of practice of the present invention in avoiding the need to preheat and maintain such heat of the substrate for welding is the elimination of associated equipment and accessories needed for such operations. A result of practice of the present invention is a relatively thin weld bead profile and a significantly reduced time of processing compared with welds produced by known methods.

The present invention has been described, in various embodiments and forms, in connection with specific examples and combinations. However, it should be understood that they are intended to be typical of rather than in any way limiting on the scope of the invention. Those skilled in the various arts associated with this invention will understand that it is capable of variations and modifications without departing from the scope of the appended claims.

What is claimed is:

1. A laser repair method for repairing a Ni base superalloy substrate surface having a gamma prime content of at least about 30 volume % comprising the steps of:
    providing and maintaining the substrate surface at ambient temperature;
    providing a laser with a laser beam that operates at least in a power range of about 50–10000 watts per square centimeter;
    disposing the laser in juxtaposition with the substrate surface;
    focusing the laser beam at a point away from the substrate surface to provide a laser spot on the substrate surface in the size range of about 0.03–0.2";
    providing a relative movement between the substrate surface and the laser spot to provide an interaction time of no greater than about 10 seconds between the laser beam and the substrate surface while concurrently operating the laser beam in the power range and concurrently depositing a repair alloy powder in the laser beam to melt and fuse the repair alloy powder into a molten repair alloy and deposit the molten repair alloy on the substrate surface; and,
    cooling the molten repair alloy to provide a weld bead.

2. The method of claim 1 in which:
    the relative movement between the substrate surface and the laser spot is in the range of about 1–100 inches per minute; and,
    the powder feed rate is in the range of about 0.4–15 grams per minute.

3. The method of claim 2 in which:
    the gamma prime content of the substrate surface is in the range of about 40–75 volume %;
    the repair alloy powder is a Ni base superalloy matched with the Ni base superalloy substrate surface;
    deposition of the repair alloy powder is assisted by a non-oxidizing gas; and,
    the relative movement is in the range of about 1–25 inches per minute.

4. The method of claim 3 in which the laser is a $CO_2$ continuous laser.

5. The method of claim 1 wherein the superalloy substrate surface is a damaged substrate surface of an airfoil of a turbine engine blade in which:
    the damaged substrate surface is removed; and,
    the method is repeated to provide a plurality of superimposed weld beads bonded one to another.

6. The method of claim 5 in which:
    the gamma prime content of the substrate surface is in the range of about 40–75 volume %; and,
    the relative movement is in the range of about 1–25 inches per minute.

* * * * *